United States Patent

Le Mouel et al.

[11] Patent Number: 6,148,423
[45] Date of Patent: Nov. 14, 2000

[54] SIGNAL TRANSMISSION PERFORMANCE OPTIMIZATION DEVICE IN A SYSTEM FOR TRANSMITTING DIGITAL DATA, ESPECIALLY ON AN OPTICAL LINK

[75] Inventors: Bernard Le Mouel, Saint Quay Perros; François-Xavier Ollivier, Lannion; Jean-Luc Pamart, la Roche Derrien, all of France

[73] Assignee: Alcatel Cit, Paris, France

[21] Appl. No.: 08/483,886

[22] Filed: Jun. 7, 1995

Related U.S. Application Data

[63] Continuation-in-part of application No. 08/093,705, Jul. 20, 1993, abandoned.

[30] Foreign Application Priority Data

Jul. 22, 1992 [FR] France ................................. 92 09047

[51] Int. Cl.$^7$ .................................................. G06F 11/00
[52] U.S. Cl. ........................................................ 714/708
[58] Field of Search ............................... 371/51, 5.5, 34, 371/41; 714/704, 708, 750, 763

[56] References Cited

U.S. PATENT DOCUMENTS

| | | |
|---|---|---|
| 3,534,264 | 10/1970 | Blasbalg et al. . |
| 3,900,842 | 8/1975 | Calabro et al. . |
| 4,261,054 | 4/1981 | Scharla-Nielsen . |
| 4,309,771 | 1/1982 | Wilkens . |
| 4,328,581 | 5/1982 | Harmon et al. . |
| 4,555,806 | 11/1985 | Lange et al. . |
| 4,566,100 | 1/1986 | Mizuno et al. ........................... 371/5.1 |
| 4,606,044 | 8/1986 | Kudo ........................................... 379/6 |
| 4,710,925 | 12/1987 | Negi . |
| 4,720,829 | 1/1988 | Fukasawa et al. . |
| 4,788,696 | 11/1988 | Sakane et al. ........................... 371/5.2 |
| 4,901,319 | 2/1990 | Ross . |
| 4,932,029 | 6/1990 | Heichler ................................... 371/43 |
| 4,941,144 | 7/1990 | Mizukami . |
| 4,951,282 | 8/1990 | Mester . |
| 4,991,184 | 2/1991 | Hashimoto . |
| 5,025,444 | 6/1991 | Clayton et al. . |
| 5,123,020 | 6/1992 | Yoshimura et al. ................... 371/68.1 |
| 5,128,965 | 7/1992 | Henriksson . |
| 5,214,687 | 5/1993 | Känsäkoski et al. ..................... 379/60 |
| 5,267,068 | 11/1993 | Torihata . |
| 5,323,421 | 6/1994 | La Rosa et al. ......................... 375/10 |

*Primary Examiner*—Robert W. Beausoliel, Jr.
*Assistant Examiner*—Pierre Eddy Elisca
*Attorney, Agent, or Firm*—Sughrue, Mion, Zinn, Macpeak & Seas, PLLC

[57] ABSTRACT

A system for transmitting digital information, especially on an optical link, comprises a send end unit and a receive end unit. It includes a device for evaluating the bit error rate at the receiving end and a device for controlling one or more characteristic parameters of the send end unit and/or the receive end unit according to the evaluated bit error rate and in such a way as continuously to optimize the parameter(s) in the light of the actual performance of the transmission system.

6 Claims, 3 Drawing Sheets

SIGNAL TRANSMISSION PERFORMANCE OPTIMIZATION DEVICE IN A SYSTEM FOR TRANSMITTING DIGITAL DATA, ESPECIALLY ON AN OPTICAL LINK

This is a Continuation-in-part of application Ser. No. 08/093,705 filed Jul. 20, 1993, now abandoned.

BACKGROUND OF THE INVENTION

1. Field of the Invention

The present invention concerns the transmission of digital data, especially on an optical link.

2. Description of the Prior Art

In systems for transmitting digital data, especially on an optical link, transmission quality (as measured by the bit error rate at the receiving end, namely the ratio of the number of erroneous bits downstream of the decision operation carried out at the receiving end of any such system to enable said data to be reconstituted to the total number of bits received) depends largely on the performance of the transmitter and the receiver, and in particular on the performance of the optical transmitter and receiver in the case of an optical link.

The characteristic parameters of the transmitter and the receiver (in the case of an optical link, for example, the wavelength and the optical power transmitted, or the avalanche factor of a receiving photodiode) are currently determined, together with other parameters characteristic of the system (including the type of fiber used in the case of an optical link), when the system is designed on the basis of the requirements of the system user (including the length of the link, the bit rate to be transmitted and the maximum bit error rate acceptable at the receiving end) in order to guarantee at the receiving end a bit error rate not more than the maximum acceptable bit error rate specified by the user.

A drawback of this way of setting characteristic parameters of the transmitter and the receiver is that it does not necessarily lead, in use, to an optimum point of operation of the transmitter and/or the receiver, among other things because it does not allow for changes in these parameters with time.

There are transmission systems, including optical transmission systems, in which the send optical wavelength is slaved in use to a reference wavelength determined when the system is designed, as mentioned above, in this instance to locate it within a particular optical window in turn depending on the type of fiber used and the possible use on the link of components such as optical amplifiers.

A drawback of any such control mechanism is that it is relatively costly and complex to implement as, among other things, it requires the use of a highly stable optical source whose wavelength is precisely known. Also, it does not necessarily lead to an optimum point of operation for the optical transmitter in the sense that, being a localized function, it does not allow for the overall effect of the transmission system, i.e. in this instance the conjugate effects on system performance of wavelength drift and possible changes of other transmission system characteristic parameters.

An object of the present invention is a system for transmitting digital data, especially on an optical link, with which the above drawbacks can be avoided.

SUMMARY OF THE INVENTION

The present invention consists in a system for transmitting digital data, especially on an optical link, comprising a send end unit, a receive end unit, an error correcting decoder localized in said receive end unit and cooperating with an error correcting coder localized in said send end unit, said system comprising means for evaluating the bit error rate at the receiving end before error correcting decoding and means for controlling one or more characteristic parameters of the send end unit and/or the receive end unit according to the evaluated bit error rate and according to the correct capabilities of the error correcting code employed so as continuously to optimize said parameter(s) in the light of the actual performance of the transmission system without the bit error rate at the output of said decoder exceeding the maximum bit error rate specified for said transmission system.

Other objects and features of the present invention will emerge from the following description of embodiments of the invention given by way of example in the case of an optical link and with reference to the appended drawings.

BRIEF DESCRIPTION OF THE DRAWINGS

FIG. 4 is a block diagram of one embodiment of a receive end unit in accordance with the invention.

DETAILED DESCRIPTION OF THE INVENTION

Figure 1:
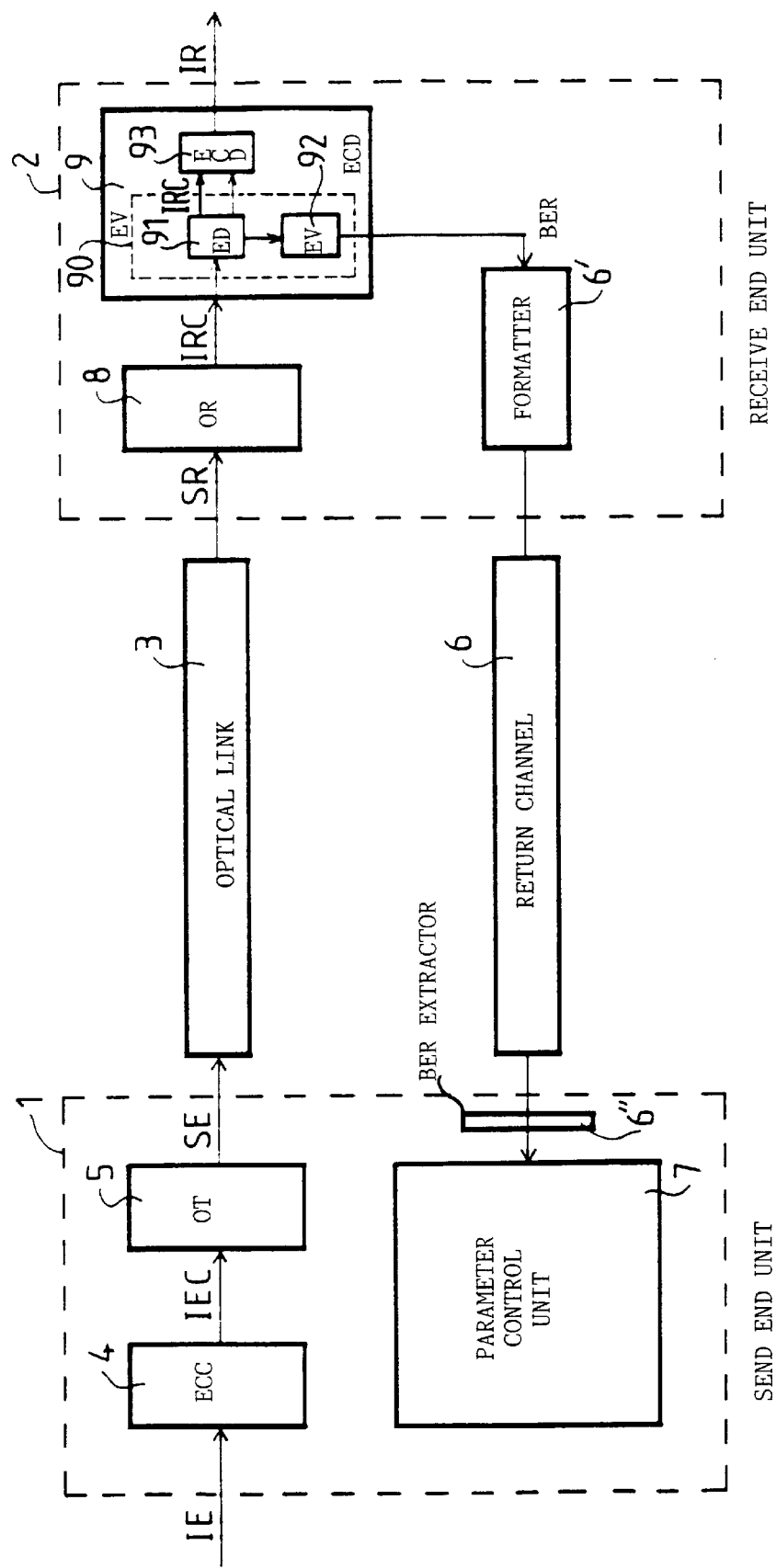
FIG. 1 is a block diagram of one embodiment of an optical transmission system in accordance with the invention controlling one or more characteristic parameters of the optical transmitter.

The optical transmission system in accordance with the invention shown in FIG. 1 comprises a send end unit 1 and a receive end unit 2 connected by an optical link 3. This system may further comprise one or more intermediate units such as optical amplifier repeaters (not shown in this figure).

The send end unit 1 includes an error correcting coder (ECC) 4 which receives the digital data IE to be transmitted.

The error correcting coder may use an error correcting code such as a block linear code like the B.C.H. (Bose Chaudhuri-Hocquenghem) or Reed-Solomon codes, or a convolutional code, or a combination of more than one such code, identical to or different than each other, descriptions of such codes being available in the literature.

The send end unit 1 also includes an optical transmitter (OT) 5 which receives the coded data IEC from the error correcting coder and which supplies an optical signal SE transmitted on the optical link. The optical transmitter 5 includes an electro-optical transducer and possibly a formatter for formatting in a manner suitable for transmission on an optical link the digital data to be transmitted received in this example from the error correcting coder.

The receive end unit 2 includes an optical receiver (OR) 8 which receives an optical signal SR and which itself includes an opto-electronic transducer, a decision unit and possibly a format converter for converting the digital data format used for transmission on the optical link to the original format.

The optical receiver 8 supplies digital data IRC to an error correcting decoder (ECD) 9 appropriate to the code chosen at the transmitting end for use in the error correcting coder 4. The error correcting decoder 9 deliver data IR.

In the FIG. 1 example the error correcting decoder 9 also supply a signal BER indicating the bit error rate before error correcting decoding.

The signal BER is provided by a bit error rate evaluation (EV) unit 90 comprising an error detection (ED) unit 91 and an evaluation (EV) unit 92 for evaluating the bit error rate from data supplied by the error detection unit 91. The unit 92 supplies the signal BER.

In addition to the units 91 and 92 the error correcting decoder 9 comprises an error correcting decoding (EDC) unit 93 supplying the data IR derived from the data IRC forwarded to it by the error detection unit 91 and from data produced for this purpose by said unit 91.

As shown in FIG. 1 the signal BER is sent to the send end unit 1 via a return channel 6 which may be part of the data stream transmitted on the return link in the case of a bidirectional optical link but which could instead be transmitted on a separate optical or non-optical link, for example a link via the public switched telephone network.

Before it is sent, the signal BER is converted to a format appropriate to the return channel by a formatter 6'.

The signal from the formatter 6' sent over the return channel 6 is received at the send end unit by a bit error rate extractor 6" whose function is complementary to that of the formatter 6'. The extracted BER is applied to a unit 7 for controlling one or more characteristic parameters of the optical transmitter.

In the FIG. 1 example the return channel 6 conveys bit error rate information from the receive end unit to the send end unit in which the control unit 7 is localized which controls the parameter(s) concerned of the optical transmitter. The return channel 6 could, however, be used to convey these control signals directly if they were produced in the receive end unit.

The control unit 7 controls the parameter(s) according to the bit error rate at the input of the decoding means 9 and the error correcting capabilities of the error correcting code employed so as continuously to optimize the parameter(s) in the light of the actual performance of the transmission system, without the bit error rate at the output from the decoding means exceeding the maximum bit error rate specified for the transmission system.

In this way the operating point of the optical transmitter is continuously optimized in relation to the actual performance of the transmission system without requiring any previous measurement of the parameter(s) concerned, the error correcting code being used both to evaluate this actual performance and to mask from the user any errors that occur in operation, specifically by the very nature of this continuous search for the optimum operating point.

Characteristic parameters of the optical transmitter suitable for such control include, for example:
the optical wavelength,
the optical power,
the temperature,
the polarization point of an external modulator in the case of an electro-optical transducer in the form of an optical source which cannot be modulated directly associated with an external modulator.

Figure 2:
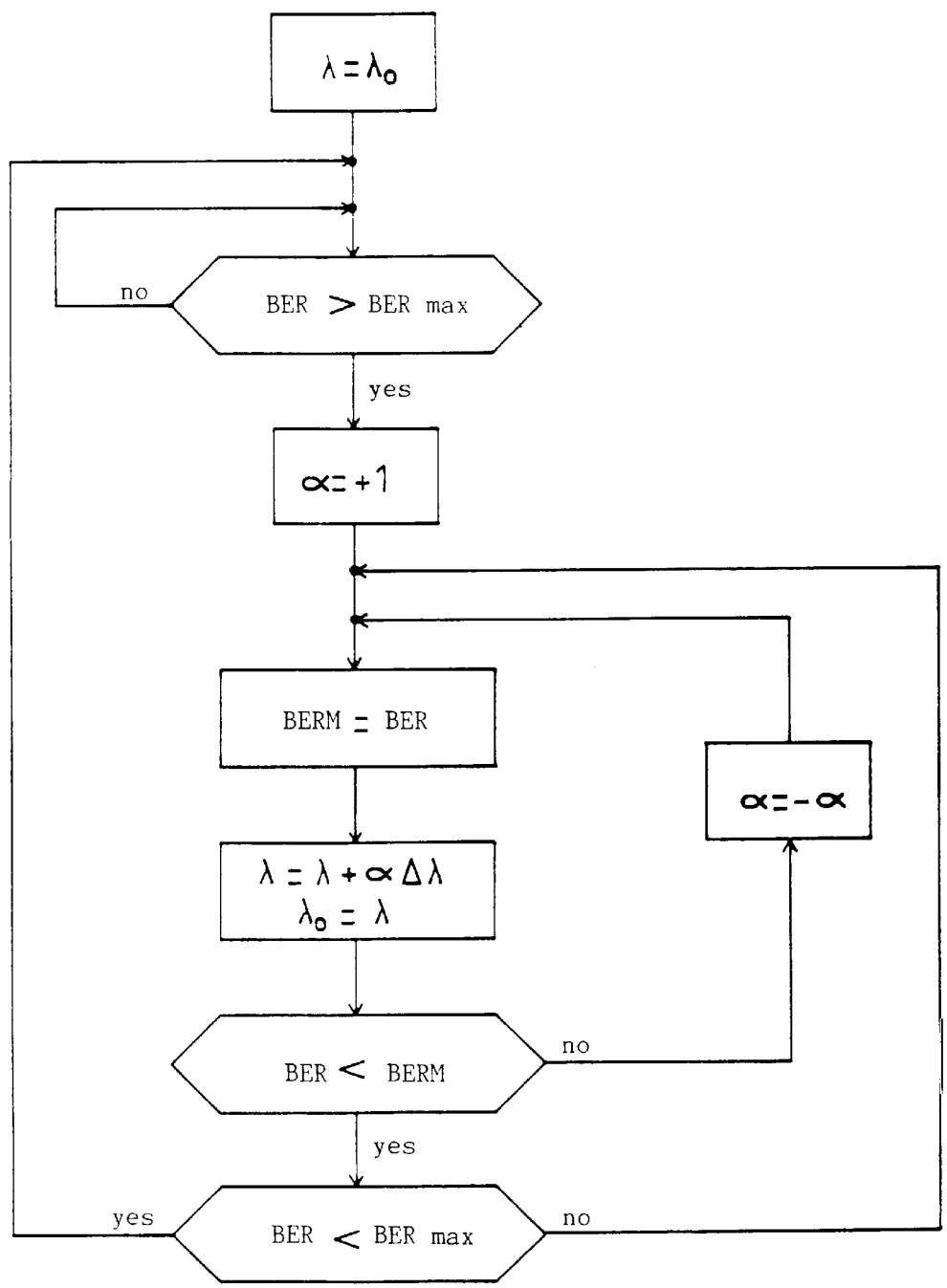
FIG. 2 shows an algorithm illustrating the principle of parameter control, in this example control of the wavelength of the optical transmitter.

There is now described with reference to FIG. 2 one possible algorithm for the operation of the control means 7, taking by way of example the control of a single characteristic parameter of the optical transmitter, namely the transmit wavelength.

After a first step of S1 of initializing the optical transmitter wavelength $\lambda$ to a start value contained in an intermediate variable $\lambda_0$ stored in REPROM, a second step S2 of the algorithm determines if the bit error rate BER at the input of the error correcting decoder is or is not greater than a maximum acceptable bit error rate BERmax at the input of the error correcting decoder. The bit error rate BERmax is less than or slightly less than a it error rate BERMAX equal, at the output of the error correcting decoder and allowing for the correction capabilities of the error correcting code employed, to a bit error rate value equal to the maximum bit error rate berMAX specified for the transmission system.

The bit error rate BERmax is lower or slightly lower than the bit error rate BERMAX to ensure that the bit error rate "ber" at the output of the decoder does not exceed the maximum bit error rate berMAX specified for the transmission system under any circumstances, including if the bit error rate BER becomes greater than the bit error rate BERmax. The margin by which BERmax is less than BERMAX is at the discretion of the operator in each case. This margin may be increased to allow for other optical transmitter optimizing criteria such as economizing its service life.

If this stage indicates that the bit error rate BER is greater than the bit error rate BERmax a coefficient $\alpha$ which toggles the wavelength increment direction is initialized to the value 1 in step S3 and the bit error rate value BER is placed in an intermediate variable BERM stored in REPROM in step S4.

The wavelength $\lambda$ is then incremented in step S5 by $\alpha\Delta\lambda$ where $\Delta\lambda$ is the absolute value of the wavelength increment. The incremented value is placed in the intermediate variable $\lambda_0$.

The algorithm then determines if the current bit error rate BER is or is not less than the value contained in the variable BERM in step S6.

If it is, the incrementing direction is correct and step S7 determines whether the current bit error rate BER is or is not less than the bit error rate BERmax.

If the current bit error rate BER is less than the bit error rate BERmax the wavelength may remain at the value acquired in this way and the process is reiterated from the first stage.

If the current value of the bit error rate BER is greater than the bit error rate BERmax, although the incrementing direction is correct, the modification of the wavelength is not yet finished and the process is reiterated from the stage in which the current bit error rate BER is stored in the intermediate variable BERM.

When the current bit error rate BER is compared to the (previous) value contained in the intermediate variable BERM, if the current bit error rate BER is found to be greater than the value contained in the intermediate variable BERM, the incrementing direction is incorrect, in which case the incrementing direction is changed in step S8 (in this example by changing the coefficient $\alpha$ to $-\alpha$) and the process is reiterated from the stage in which the current bit error rate BER is stored in the intermediate variable BERM.

Note that the value $\Delta\lambda$ must be low enough to guarantee that the bit error rate "ber" at the output of the decoder does not exceed the maximum bit error rate berMAX specified for the transmission system in any circumstances, including if the first incrementing direction considered is incorrect if BER becomes greater than BERmax.

On the other hand, if the first stage indicates that the bit error rate BER is less than the bit error rate BERmax, the wavelength $\lambda$ of the optical transmitter retains, in this example, its previously acquired value and this first stage continues until the bit error rate BER becomes greater than the bit error rate BERmax, should it do so.

Note that for some parameters, such as the transmitted optical power, for example, if the first stage indicates that the bit error rate BER is less than the bit error rate BERmax, it is possible to adjust this parameter to authorize deterioration of transmitter performance if economizing on the service life of the system is another optimizing criteria to be taken into account.

Note also that the value contained in the intermediate variable $\lambda_0$ when the system is put into service may be a nominal value of the wavelength determined as part of the system design process, for example, as mentioned in the preamble.

Note further that the algorithm described above by way of example can be transposed to the control of parameters other than the wavelength and to the control of several parameters simultaneously, using a priority management mechanism, for example.

Figure 3:
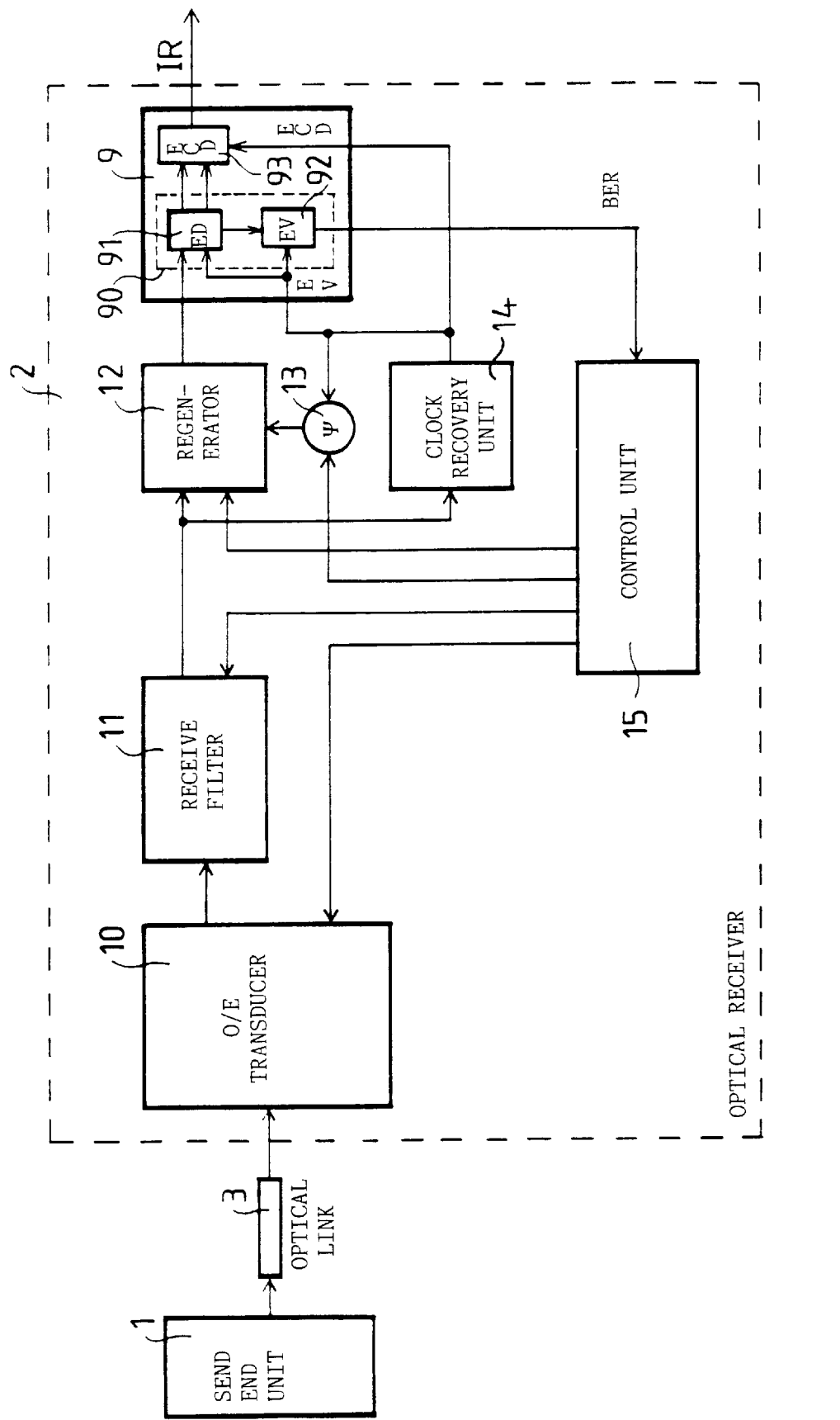
FIG. 3 is a block diagram of one embodiment of an optical transmission system in accordance with the invention controlling one or more characteristic parameters of the optical receiver.

FIG. 3 is a block diagram of an optical transmission system controlling one or more characteristic parameters of the optical receiver.

For simplicity, units common to the transmission system shown in FIG. 1 are identified by the same reference number and are not described again here.

FIG. 3 shows the optical receiver in more detail; it comprises:

- an opto-electronic transducer 10 receiving the received optical signal SR and in this example comprising an avalanche photodiode whose avalanche factor is externally controlled,
- a receive filter 11 connected to the output of the opto-electronic transducer to reduce the effect of distortion and interference in the transmitted signals with its cut-off frequency and its roll-off externally controlled,
- a regenerator 12 connected to the output of the receive filter 11 and comprising (not shown in the drawing):
    - means for sampling the signal from the receive filter using a sampling clock signal from a phase shifter 13 operating on the sampling clock signal and receiving a clock signal from a clock recovery unit 14 receiving the received digital bit stream and an external sampling clock signal phase control signal,
    - a decision unit adapted to compare the samples obtained in this way with a decision threshold whose level is externally controlled.

The signal from the regenerator 12 is fed to the error correcting decoder 9 which is as shown in FIG. 1 (except that the control of the units 91, 92 and 93 by the clock signal from the unit 14 is specifically shown) and supplies, as in FIG. 1, corrected digital data IR and an indication of the bit error rate BER before error correcting decoding.

The bit error rate BER is applied to a control unit 15 adapted to produce the aforementioned external control signals (for the photodiode avalanche factor, the receive filter cut-off frequency and roll-off, the sampling clock signal phase and the decision threshold level) according to the bit error rate BER and to the error correcting capabilities of the error correcting code so as continuously to optimize these parameters in the light of the actual performance of the transmission system without the bit error rate at the output of the error correcting decoder exceeding the maximum bit error rate specified for the transmission system.

The control unit 15 may operate according to a principle in all respects analogous to that described above with reference to FIGS. 1 and 2 in the case of controlling one or more characteristic parameters of the optical transmitter (in the case of controlling a single characteristic parameter of the receive end unit, for example, substituting an intermediate variable appropriate to the parameter in question for the intermediate variable $\lambda_0$).

Simultaneous control of one or more characteristic parameters of the optical transmitter and one or more characteristic parameters of the optical receiver is also feasible.

In the embodiments described above with reference to FIGS. 1 to 3 the error correcting decoder localized in the receive end unit and cooperating with the error correcting coder localized in the send end unit is further employed to supply the bit error rate at the receiving end prior to error correcting decoding. It would be possible to use a simple error detecting code instead of an error correcting code to evaluate said bit error rate at the receiving end prior to error correcting decoding, in which case the means for evaluating the bit error rate would comprise an error detecting decoder localized in the receive end unit and cooperating with an error detecting coder localized in the send end unit.

Characteristic parameters of the send end unit or the receive end unit which may be controlled in accordance with the present invention include, for example, characteristic parameters of specific devices provided in either unit to combat phenomena of dispersion due to propagation speed differences of two propagation modes transmitted in a non-isotropic optical fiber (due either to its construction or to stresses occurring in service), the effect of such phenomena being to spread the light pulses transmitted and thereby degrade the performance of the transmission system.

Devices which may be used to combat such phenomena include, for example:

- devices for applying mechanical stress (for example crushing or twisting) to a spooled long length of the fiber,
- devices for modifying the temperature,
- devices for modifying very slightly the transmit wavelength,
- devices for dissociating said propagation modes, converting them to electrical form, delaying one relative to the other and recombining them optically.

In the first of these examples, said mechanical stress would be controlled in accordance with the invention, in the second of these examples the temperature would be controlled in accordance with the invention, in the third of these examples the transmit wavelength would be controlled in accordance with the invention and in the fourth of these examples the time-delay would be controlled in accordance with the invention.

The Fiber Optics Handbook published by Hewlett Packard in 1989, page 164, describes a fiber based polarization controller comprising two single mode fiber loops, the planes of which can be rotated with respect to the other. Such a polarization controller can be used in the send end unit represented on FIG. 1, to control the relative phase of two propagation modes sent by the send end unit 1. The parameter control unit 7, represented on FIG. 1, can control an electric motor for moving the two loops of such a polarization controller. Page 165 of the same document describes a polarization controller comprising a piezoelectric rod for squeezing a single mode fiber. Such a controller could be used as well.

The article "Lithium Niobate Guided Wave Network For A Coherent Receiver" by Heidrich et al., *Optics Letters*, 1989, NO. 14, pp 99–101, describes a polarization controller made of lithium niobate, which could be used as well in the embodiment illustrated in FIG. 1, to control the relative phase of the two propagation modes of a carrier sent by the send end unit 1.

FIG. 4 shows a block diagram of one embodiment of the receive end unit 2 controlling the relative phase between two propagation modes which are received by the receive end unit 2. The receive end unit 2 includes a polarization beam splitter 21 for splitting a received optical signal SR into a transverse electric mode beam TE and a transverse magnetic mode beam TM, two optical receivers 22, 23 for converting the two beams into two respective electrical signals, and a variable delay line 24 for delaying an electrical signal supplied by the optical receiver 23. The unit 2 further includes a delay line control unit 27 which supplies an electrical signal to a control input of the delay line 24, an adder 25 for adding an electrical signal supplied by the optical receiver 22 and an electrical signal supplied by the delay line 24, and an error correcting decoder 26, similar to decoder 90 previously described.

The decoder 26 receives an electrical signal supplied by the adder 25, and supplies a bit error rate signal BER to an input of the delay line control unit, and supplies data 1R. The error correcting decoder 26 comprises an error detecting unit 31, evaluating unit 32, for evaluating the bit error rate signal BER, and an error correcting decoding unit 33 supplying the data 1R.

What is claimed is:

1. A signal transmission performance optimization device in a system for transmitting digital data, especially on an optical link, wherein an optical carrier propagates according to two propagation modes, comprising:

a send end unit, a recieve and unit, an error correcting decoder localized in said receive end unit, and cooperating with an error correcting coder localized in said send end unit, means for evaluating a bit error rate at said receive end unit before error correcting decoding; and control means for controlling a relative phase between two propagation modes transmitted via said optical link for at least one of said send end unit and said receive end unit according to an evaluated bit error rate and according to an error correcting code employed in said error correcting coder, wherein said relative phase between said two propagation modes is continuously optimized to prevent the bit error rate at an output of said error correcting decoder from exceeding a maximum bit error rate specified for said system.

2. The signal transmission performance optimization device according to claim 1, wherein said means for evaluating the bit error rate at said receive end unit before error correcting decoding comprises an error detection unit and an evaluation unit for evaluating the bit error rate from data supplied from said error detection unit.

3. The signal transmission performance optimization device according to claim 1, wherein said control means optimizes said relative phase by adjusting said relative phase between said two propagation modes to improve said bit error rate in event of deterioration of the bit error rate at an input of said error correcting decoder.

4. The signal transmission performance optimization device according to claim 1, wherein said control means optimizes said relative phase between two propagation modes by adjusting said relative phase to authorize degradation of the performance of at least one of said send end unit and said receive end unit in the event of the bit error rate at an input of said error correcting decoder stabilizing.

5. The signal transmission performance optimization device according to claim 1, wherein said control means is adapted to enable optimization while maintaining the bit error rate at an input of said error correcting decoder at all times less than or equal to a value less than that at which said maximum bit error rate specified for said system is obtained at the output of said error correcting decoder.

6. The signal transmission performance optimization device according to claim 1, wherein said control means includes a return channel for conveying from said receive end unit to said send end unit one of the bit error rate detected by said error correcting decoder and control signals for said relative phase of said send end unit, depending on whether said control signals are produced in said send end unit or in said receive end unit.

* * * * *